(12) United States Patent
Takigahira

(10) Patent No.: US 9,159,019 B2
(45) Date of Patent: Oct. 13, 2015

(54) ANTENNA AND WIRELESS TAG

(71) Applicant: FUJIKURA LTD., Koto-ku, Tokyo (JP)

(72) Inventor: Masato Takigahira, Sakura (JP)

(73) Assignee: FUJIKURA LTD., Tokyo (JP)

( * ) Notice: Subject to any disclaimer, the term of this patent is extended or adjusted under 35 U.S.C. 154(b) by 18 days.

(21) Appl. No.: 14/157,005

(22) Filed: Jan. 16, 2014

(65) Prior Publication Data

US 2014/0131455 A1    May 15, 2014

Related U.S. Application Data

(63) Continuation of application No. PCT/JP2012/068504, filed on Jul. 20, 2012.

(30) Foreign Application Priority Data

Jul. 20, 2011   (JP) ................. 2011-159216

(51) Int. Cl.
| | | |
|---|---|---|
| G06K 19/06 | (2006.01) | |
| G06K 19/077 | (2006.01) | |
| H01Q 1/38 | (2006.01) | |
| H01Q 9/36 | (2006.01) | |
| H01Q 9/42 | (2006.01) | |
| H01Q 1/22 | (2006.01) | |
| H01Q 9/04 | (2006.01) | |

(52) U.S. Cl.
CPC ........ *G06K 19/07792* (2013.01); *H01Q 1/2208* (2013.01); *H01Q 1/38* (2013.01); *H01Q 9/0407* (2013.01); *H01Q 9/36* (2013.01); *H01Q 9/42* (2013.01)

(58) Field of Classification Search
CPC .................. G06K 19/0723; G06K 19/07749; G06K 19/07773; G06K 19/07792; H01Q 1/38
USPC .................................................. 235/492, 487
See application file for complete search history.

(56) References Cited

U.S. PATENT DOCUMENTS

| | | | |
|---|---|---|---|
| 5,055,968 A | 10/1991 | Nishi et al. | |
| 6,535,167 B2 * | 3/2003 | Masuda et al. | 343/700 MS |
| 8,692,719 B2 * | 4/2014 | Yagi et al. | 343/700 MS |
| 2001/0043159 A1 * | 11/2001 | Masuda et al. | 343/700 MS |

(Continued)

FOREIGN PATENT DOCUMENTS

| | | |
|---|---|---|
| CN | 1332490 A | 1/2002 |
| CN | 201072804 Y | 6/2008 |

(Continued)

OTHER PUBLICATIONS

Notice of Allowance corresponding to Japanese Application No. 2013-522029 dated Dec. 10, 2013.

(Continued)

*Primary Examiner* — Paultep Savusdiphol
(74) *Attorney, Agent, or Firm* — Sughrue Mion, PLLC

(57) ABSTRACT

An antenna (1) in accordance with the present invention includes a ground plate (11) and an antenna element (12) provided on an identical plane or on different planes parallel to each other, and is suitable for use in a wireless tag (2). The antenna (1) in accordance with the present invention further includes a shortening capacitor (14) that bridges the ground plate (11) and an end part (12B) of the antenna element (12), the end part (12B) being opposite to the power feed-side end part.

15 Claims, 11 Drawing Sheets

(56) References Cited

U.S. PATENT DOCUMENTS

| | | | |
|---|---|---|---|
| 2003/0148784 A1* | 8/2003 | Sawamura et al. | 455/550 |
| 2006/0109192 A1* | 5/2006 | Weigand | 343/795 |
| 2007/0222697 A1* | 9/2007 | Caimi et al. | 343/861 |
| 2007/0298724 A1* | 12/2007 | Sulkowski et al. | 455/67.13 |
| 2009/0153407 A1* | 6/2009 | Zhang et al. | 343/702 |
| 2009/0184878 A1* | 7/2009 | Lai | 343/845 |
| 2009/0267854 A1* | 10/2009 | Oksanen et al. | 343/787 |
| 2010/0149053 A1 | 6/2010 | Nakano et al. | |
| 2010/0156745 A1* | 6/2010 | Andrenko et al. | 343/848 |
| 2011/0130179 A1* | 6/2011 | Luan | 455/575.7 |
| 2011/0298574 A1* | 12/2011 | Sato et al. | 336/84 |
| 2012/0013510 A1* | 1/2012 | Yagi et al. | 343/700 MS |
| 2012/0146865 A1* | 6/2012 | Hayashi et al. | 343/750 |

FOREIGN PATENT DOCUMENTS

| | | |
|---|---|---|
| CN | 102055076 A | 5/2011 |
| JP | 02-125797 A | 5/1990 |
| JP | 10-079622 A | 3/1998 |
| JP | 2001-326521 A | 11/2001 |
| JP | 2006-005836 A | 1/2006 |
| JP | 2006-180408 A | 7/2006 |
| JP | 2010-016501 A | 1/2010 |
| JP | 2011-070642 A | 4/2011 |
| JP | 2011-135549 A | 7/2011 |
| WO | 2009028251 A1 | 3/2009 |

OTHER PUBLICATIONS

Office Action corresponding to Japanese Application No. 2013-522029 dated Aug. 20, 2013.

International Preliminary Report on Patentability in PCT Application No. PCT/JP2012/068504 dated Jan. 30, 2014.

International Search Report for PCT/JP2012/068504 dated Oct. 16, 2012.

* cited by examiner

ANTENNA AND WIRELESS TAG

CROSS-REFERENCE TO RELATED APPLICATIONS

This application is a Continuation of PCT International Application No. PCT/JP2012/068504 filed in Japan on Jul. 20, 2012, which claims the benefit of Patent Application No. 2011-159216 filed in Japan on Jul. 20, 2011, the entire contents of which are hereby incorporated by reference.

TECHNICAL FIELD

The present invention relates to an antenna and a wireless tag device including an antenna.

BACKGROUND ART

In recent years, an RFID (Radio Frequency Identification) system has been widely used for various purposes. The RFID system includes a wireless tag and a reader, and performs various functions via wireless communications between the tag and the reader.

The wireless tag for use in the RFID system is categorized into a passive tag that contains no battery and an active tag that contains a battery. The passive tag is used as a wireless tag for wireless communications between itself and a reader that is close to it (e.g., for use as a pre-paid card). On the other hand, the active tag is used as a wireless tag for wireless communications between itself and a reader that is not close to it (e.g., for use as a tag carried by a user in a presence management system or as a tag attached to a commercial product in an inventory management system). The presence management system is disclosed in, for example, Patent Literature 1.

It is necessary that the wireless tag include an antenna for wireless communications between itself and a reader. As the antenna included in the wireless tag, a small loop antenna is often used regardless of whether the wireless tag is an active tag or a passive tag. However, the active tag including a small loop antenna has too small a radiative power that it may cause a problem in wireless communications between the tag and a reader that is not close to the tag.

One way to solve such a problem is to use a small dipole antenna or a small monopole antenna instead of the small loop antenna. It should be noted here that the small dipole antenna and the small monopole antenna mean a dipole antenna and a monopole antenna, respectively, each having an antenna element whose total length $\rho$ is much smaller than its resonant wavelength $\lambda$ (i.e., $\rho \ll \lambda$). The radiative power of the small loop antenna is proportional to $(\rho/\lambda)^4$, whereas the radiative power of each of the small dipole and monopole antennas is proportional to $(\rho/\lambda)^2$. That is, the radiative power of each of the small dipole and monopole antennas is greater than the radiative power of the small loop antenna. However, both of these small antennas, which satisfy $\rho \ll \lambda$, can only achieve a limited level of radiative power.

On the other hand, a half-wave dipole antenna satisfying $\rho = \lambda/2$ and a quarter-wave monopole antenna satisfying $\rho = \lambda/4$ are known to have better radiation efficiencies than the above-mentioned small antennas. An active tag including a half-wave dipole antenna is, for example, one that is disclosed in Patent Literature 2. The active tag disclosed in Patent Literature 2 includes a planar half-wave dipole antenna and thereby achieves a sufficient radiative power and also achieves a small thickness.

CITATION LIST

Patent Literatures

Patent Literature 1

Japanese Patent Application Publication, Tokukai, No. 2011-70642 A (Publication Date: Apr. 7, 2011)

Patent Literature 2

Japanese Patent Application Publication, Tokukaihei, No. 2-125797 A (Publication Date: May 14, 1990)

SUMMARY OF INVENTION

Technical Problem

In order for a wireless tag to comply with laws and regulations such as the Radio Act, it is often necessary that an antenna included in the tag operate in a low frequency band (low resonant frequency). However, if a card-shaped wireless tag including a planar half-wave dipole antenna or a quarter-wave monopole antenna is designed to operate in a lower frequency band, the antenna should become larger. Therefore, a card-shaped wireless tag including a planar half-wave dipole antenna or a planar quarter-wave monopole antenna cannot meet a demand for downsizing the wireless tag.

For example, in Japan, the maximum electric field strength allowed for low power radio stations such as a wireless tag is specified as shown in FIG. 13 (refer to Article 4 of the Radio Act and Article 6 of Regulations for Enforcement of the Radio Act). Specifically, in a frequency band of 322 MHz and lower, the use of a low power radio station without a license is permitted provided that the electric field strength (technically, the electric field strength at 3 meters from the low power radio station) is 500 µV/m or less; on the other hand, in a frequency band of not lower than 322 MHz but not higher than 10 GHz, the use of an extremely low power station is not permitted without a license if the electric field strength is greater than 35 µV/m. If the electric field strength is reduced to equal or less than 35 µV/m, at worst, an electromagnetic wave may not be strong enough even at a distance of 1 meter from the low power radio station. Such a low power radio station is not practical. In a frequency band of higher than 10 GHz, the electric field strength greater than 35 µV/m is permitted. However, as the frequency increases, it becomes more difficult to produce parts that constitute the low power radio station. In particular, parts for a low power radio station that operates in a frequency band of 60 GHz and higher have not been put in practical use as of now. Therefore, in order to realize a wireless tag that is easily accessible to everyone, it is preferable that an antenna included in the wireless tag has an operating frequency band of 322 MHz and lower.

However, in order to realize a half-wave dipole antenna designed to operate in a frequency band of 322 MHz and lower, it is necessary that the total length of an antenna element of the half-wave dipole antenna be $\lambda/2 \approx 46.6$ cm or greater. Therefore, given that the half-wave dipole antenna is a planar antenna, it is difficult to meet the demand of reducing the size of the wireless tag to, for example, 85.6 mm×54.0 mm. Furthermore, in order to realize a quarter-wave monopole antenna designed to operate in a frequency band of 322 MHz and lower, it is necessary that the total length of an antenna element of the quarter-wave dipole antenna be $\lambda/4 \approx 23.3$ cm or greater. Therefore, even with a planar quarter-wave dipole antenna, it is difficult to meet the above demand.

This problem arises regardless of whether or not the antenna element and a ground plate are provided on the same plane.

It should be noted that the above-mentioned size, i.e., 85.6 mm×54.0 mm (more technically, 85.60 mm×53.98 mm), is the size of a card specified as ID-1 in ISO/IEC7810. This size is often used for a passive tag such as an e-cash card. The size of an ID-1 card has a golden aspect ratio. Therefore, it looks good and also is internationally recognized as the size of a card that can be easily handled by humans. If it was possible to realize an active tag having the size of an ID-1 card, that would be ideal. However, as described earlier, it is difficult to realize an active tag having the size of an ID-1 card with the use of an existing half-wave dipole antenna or quarter-wave monopole antenna.

The present invention has been made in view of the above problems, and an object of the present invention is to realize an antenna which has a radiation efficiency as high as that of a quarter-wave monopole antenna, the antenna being designed to operate in a lower frequency band without increasing its size. In particular, an object of the present invention is to realize an antenna that is suitable for use in a thin, small wireless tag.

Solution to Problem

In order to attain the above object, an antenna in accordance with the present invention includes: a ground plate provided on a first plane; an antenna element at least part of which is provided on a second plane; and a capacitor that bridges the ground plate and a first end part of the antenna element, the first end part being opposite to a second end part that is a power feed-side end part. It should be noted here that the second plane is identical to the first plane or a plane parallel to the first plane.

According to the configuration, the antenna element is provided on a plane where the ground plate is provided or on a plane parallel to the ground plate. Therefore, it is possible to realize a thin antenna that can be mounted in or on a wireless tag. In addition, the capacitor makes it possible to cause the operating frequency band of the antenna to shift lower (i.e., possible to lower the resonant frequency) without increasing the total length of the antenna element. Accordingly, it is possible to realize an antenna configured to operate in a lower frequency band, without increasing its size. It should be noted that the antenna is a monopole antenna including a ground plate and an antenna element. Therefore, the antenna has a higher radiative power than a loop antenna that has an antenna element of the same length, and is also suitable for use in an active tag.

It should be noted that, in a case where part of the antenna element is provided on the second plane, that is, a part of the antenna element is provided on the second plane and the other part of the antenna element is not provided on the second plane, such other part may be provided on the first plane or may be provided on a third plane that is parallel to both the first plane and the second plane.

Advantageous Effects of Invention

As described above, an antenna in accordance with the present invention includes: a ground plate provided on a first plane; an antenna element at least part of which is provided on a plane that is identical to the first plane or on a second plane that is parallel to the first plane; and a capacitor that bridges the ground plate and a first end part of the antenna element, the first end part being opposite to a second end part that is a power feed-side end part. Therefore, according to the present invention, it is possible to realize an antenna configured to operate in a lower frequency band, without increasing its size. Furthermore, the antenna realized by the present invention is suitable for use in a wireless tag.

BRIEF DESCRIPTION OF DRAWINGS

FIG. 3 illustrates (i) a monopole antenna B1 including an antenna element whose total length is λ/4 and (ii) a monopole antenna B2 which includes an antenna element whose total length is h and to which the shortening capacitor having a capacitance C has been added.

Figure 1:
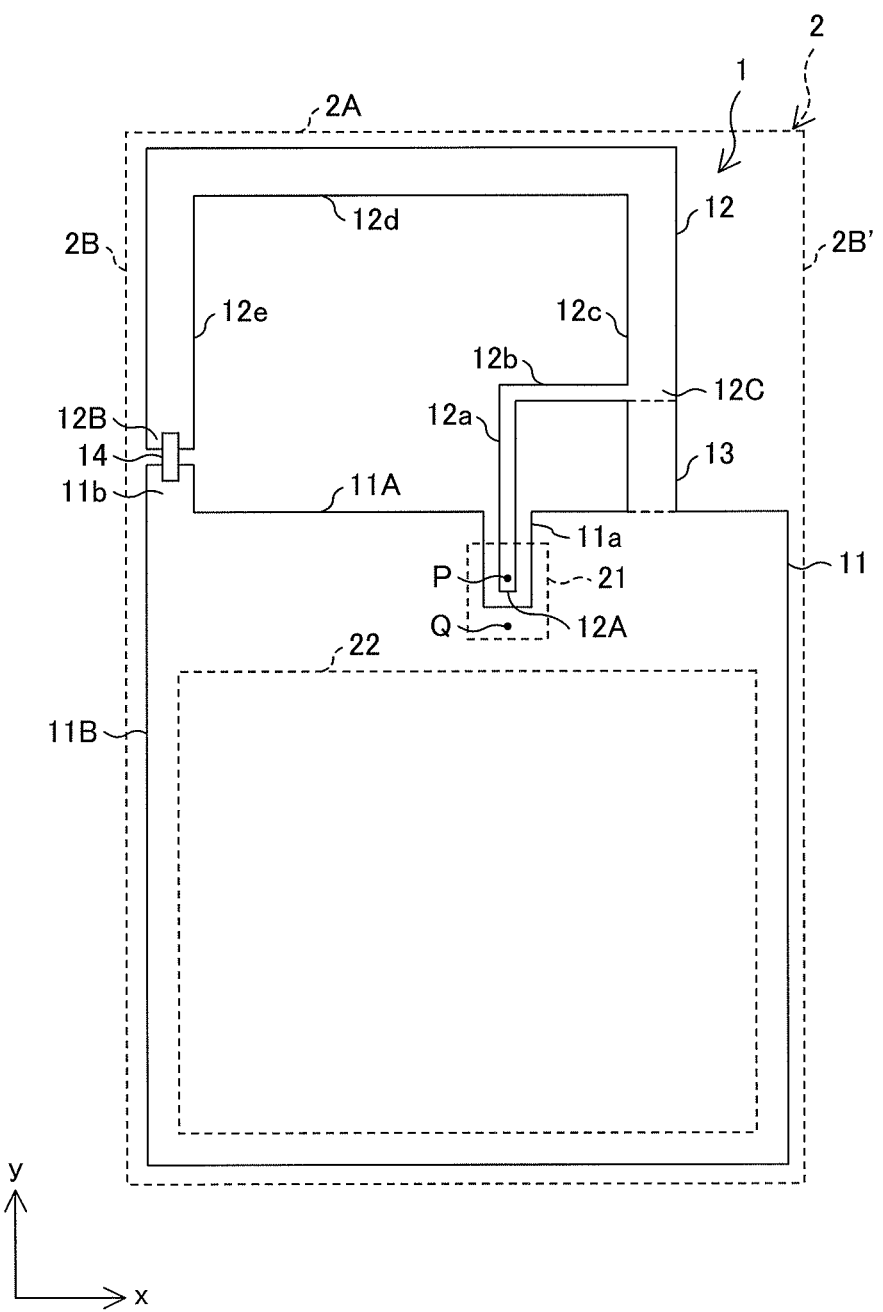
FIG. 1 is a top view illustrating a configuration of an antenna in accordance with Embodiment 1 of the present invention.
Figure 4:
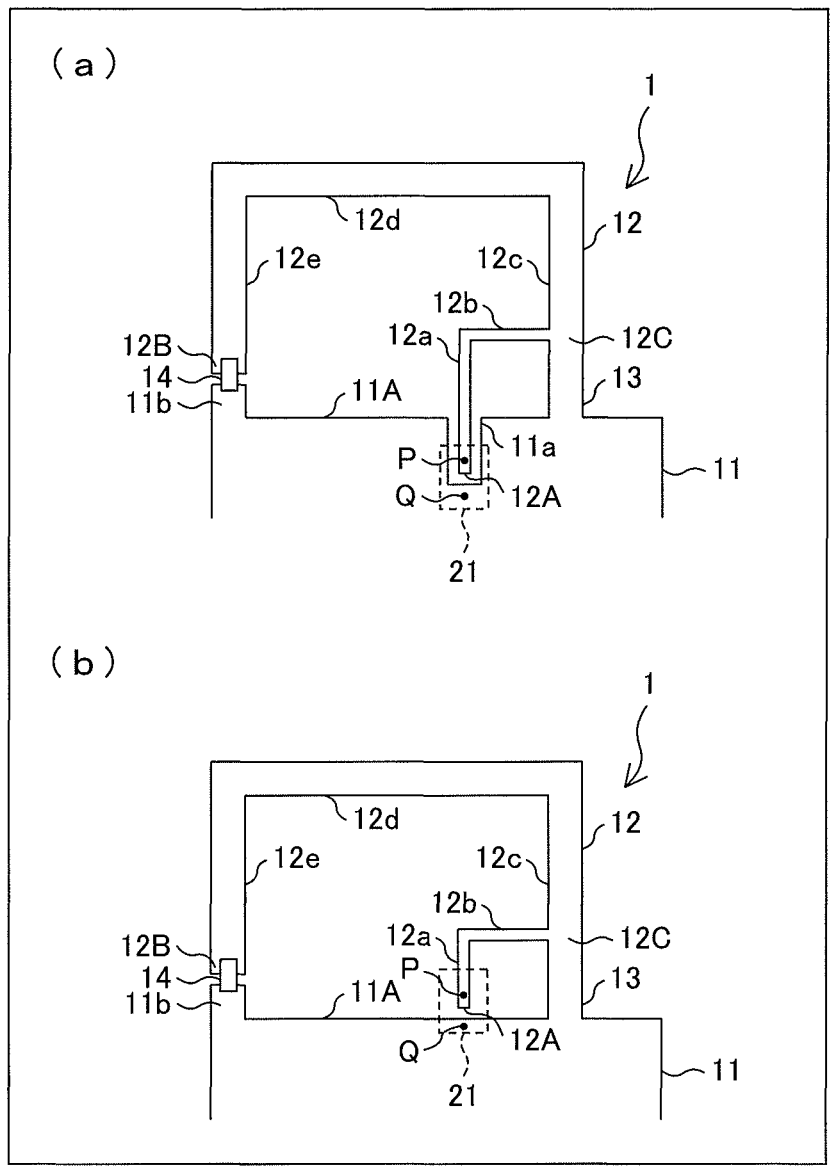

(a) of FIG. 4 is a top view illustrating a structure of a part, which includes a power feed point, of the antenna illustrated in FIG. 1. (b) of FIG. 4 is a top view of a modified example of (a) of FIG. 4.

Figure 5:
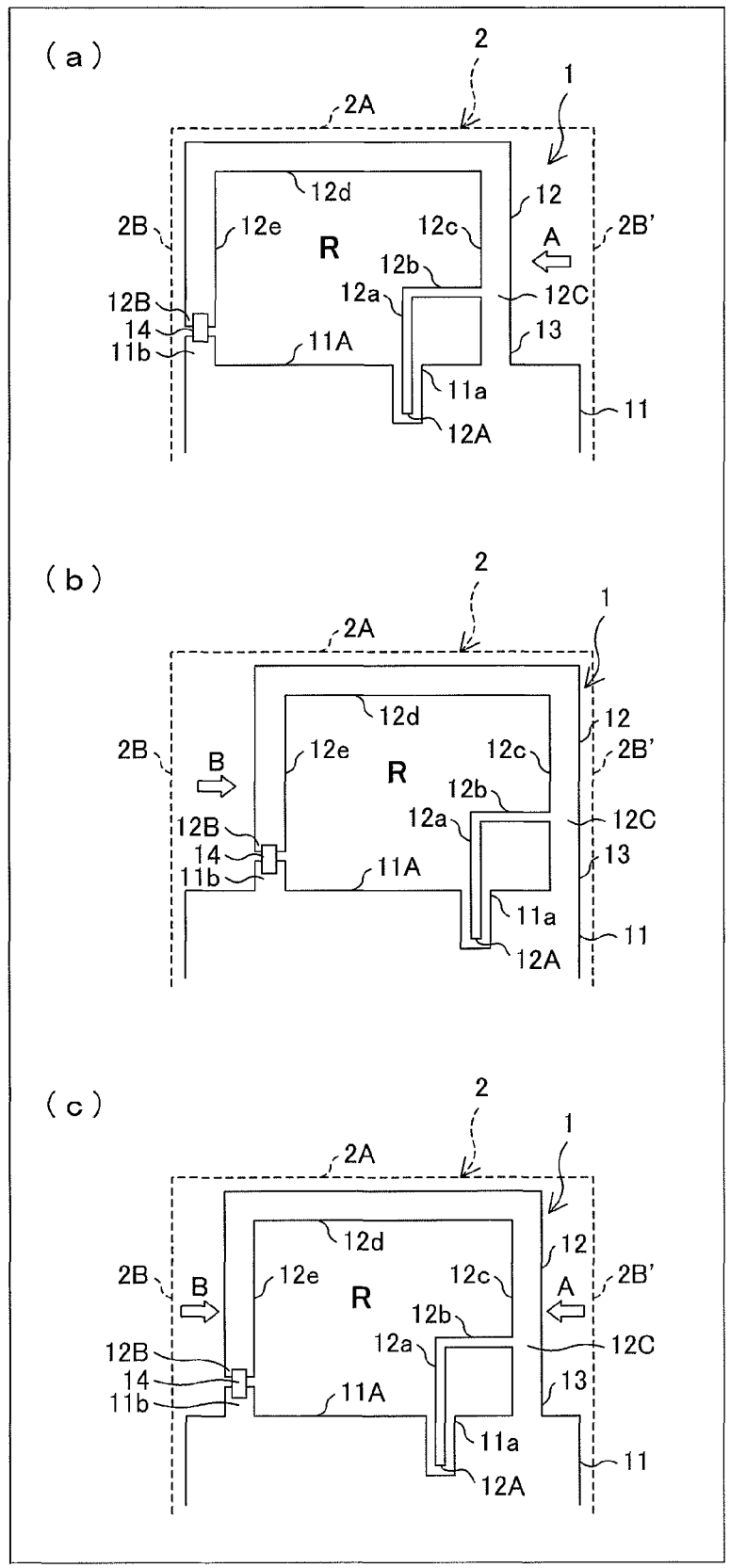

(a) of FIG. 5 is a top view illustrating a structure of a part, which includes the antenna element, of the antenna illustrated in FIG. 1. (b) and (c) of FIG. 5 are each a top view of a modified example of (a) of FIG. 5.

Figure 6:
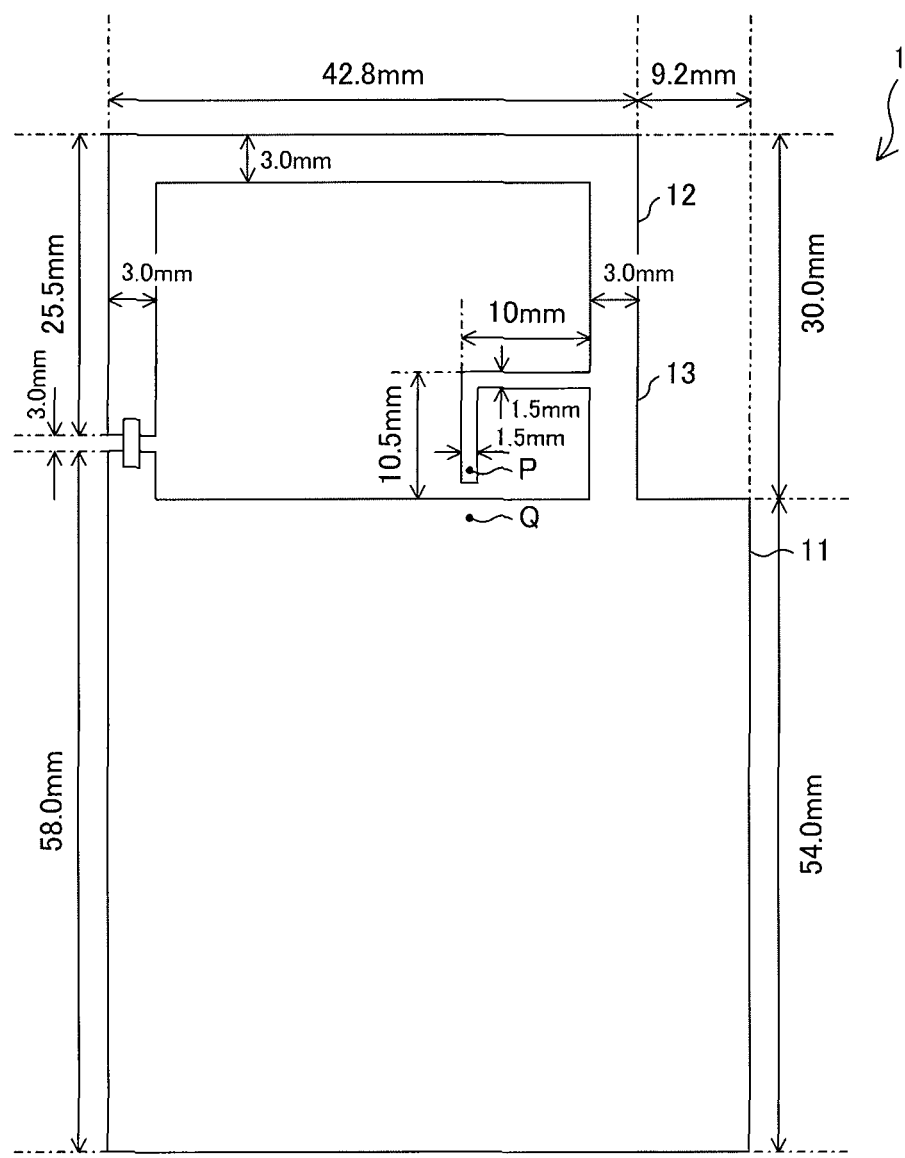

FIG. 6 is a top view illustrating an example of the antenna in accordance with Embodiment 1 of the present invention.

Figure 7:
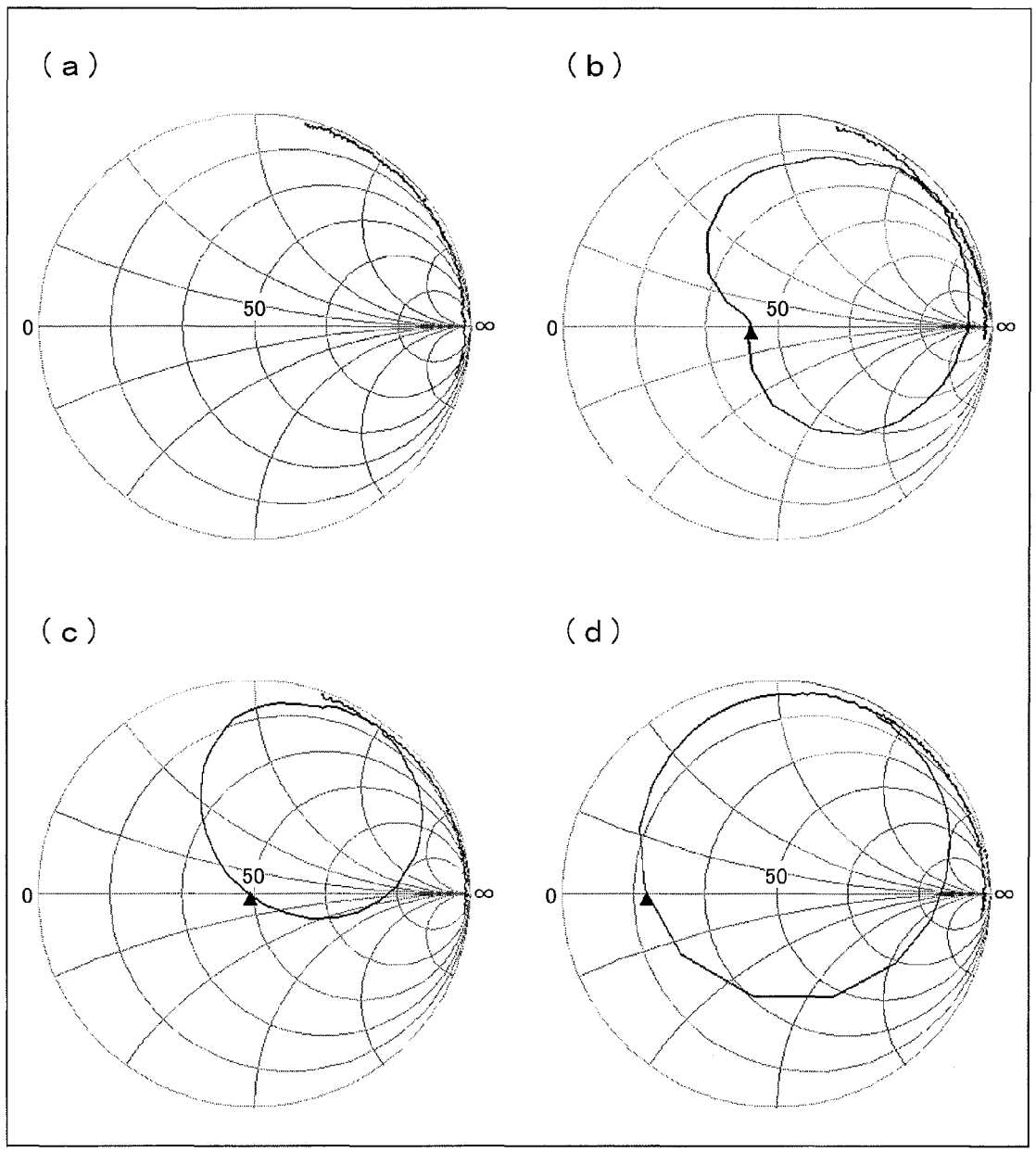

FIG. 7 shows Smith charts obtained by plotting S-parameters (S11) of the antenna illustrated in FIG. 6. (a) of FIG. 7 is a Smith chart when no shortening capacitor is added. (b) of FIG. 7 is a Smith chart when a 2-pF shortening capacitor is added. (c) of FIG. 7 is Smith chart when a 3-pF shortening capacitor is added. (d) of FIG. 7 is a Smith chart when a 4-pF shortening capacitor is added.

Figure 8:
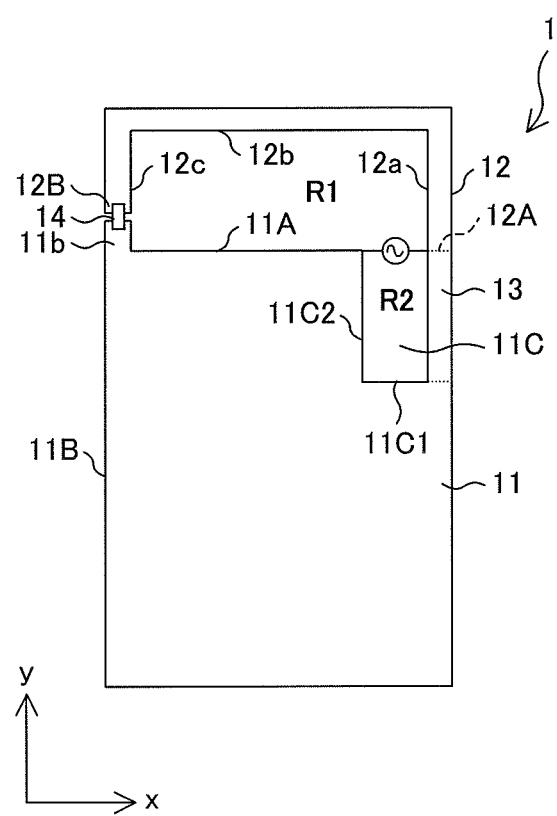

FIG. 8 is a top view illustrating a configuration of an antenna in accordance with Embodiment 2 of the present invention.

Figure 9:
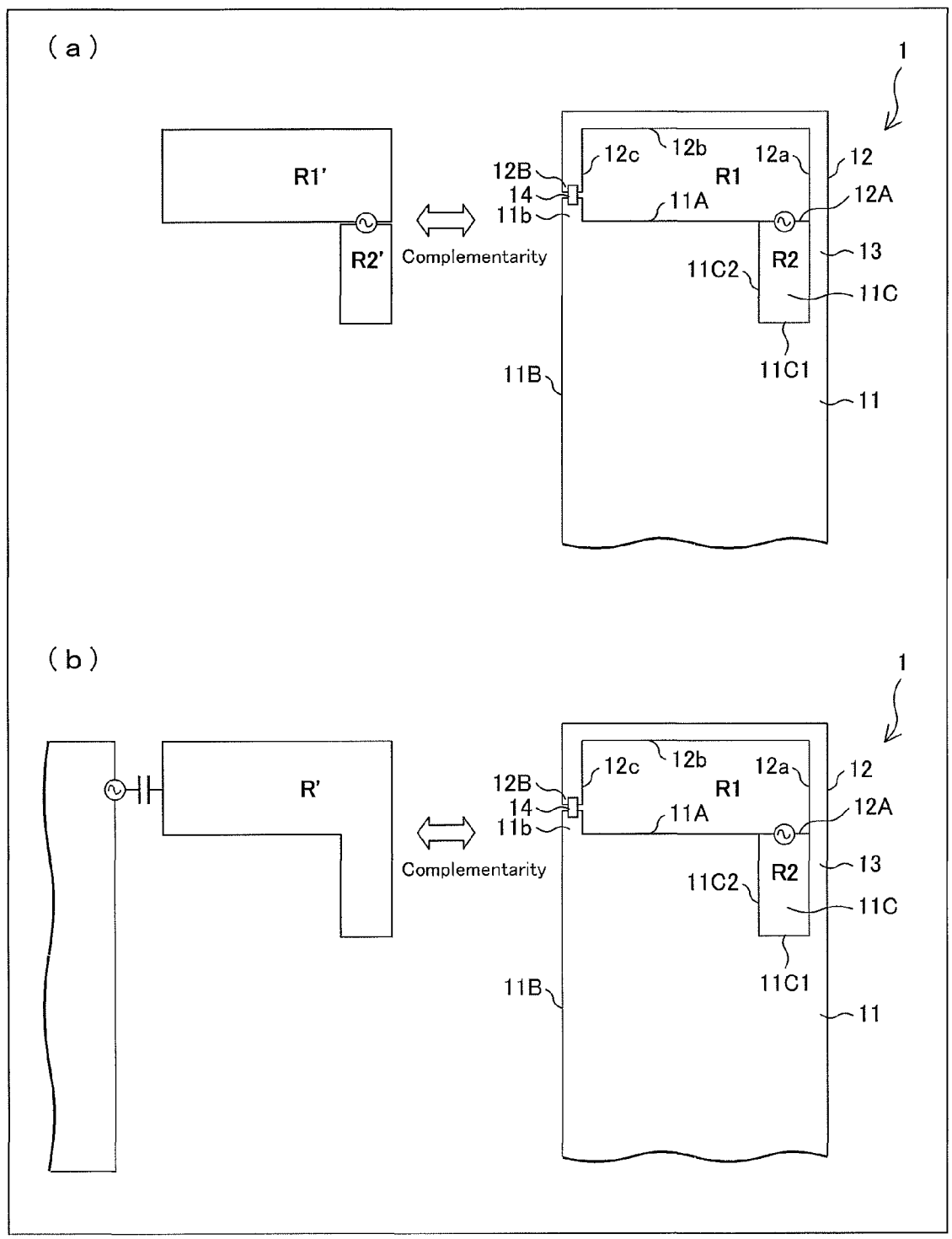

FIG. 9 is for explaining that the antenna illustrated in FIG. 8 has resonant frequencies corresponding to the shapes of respective regions R1 and R2. (a) of FIG. 9 shows that the antenna illustrated in FIG. 8 has a resonant frequency corresponding to the resonant frequency of a particular dipole antenna. (b) of FIG. 9 shows that the antenna illustrated in FIG. 8 has a resonant frequency corresponding to the resonant frequency of a particular monopole antenna.

Figure 10:
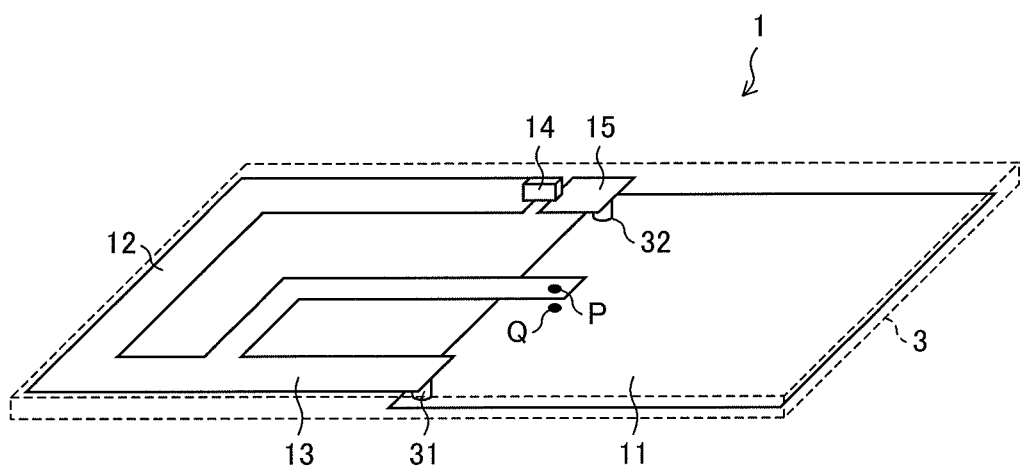

FIG. 10 is a perspective view illustrating a configuration of an antenna in accordance with Embodiment 3 of the present invention.

Figure 11:
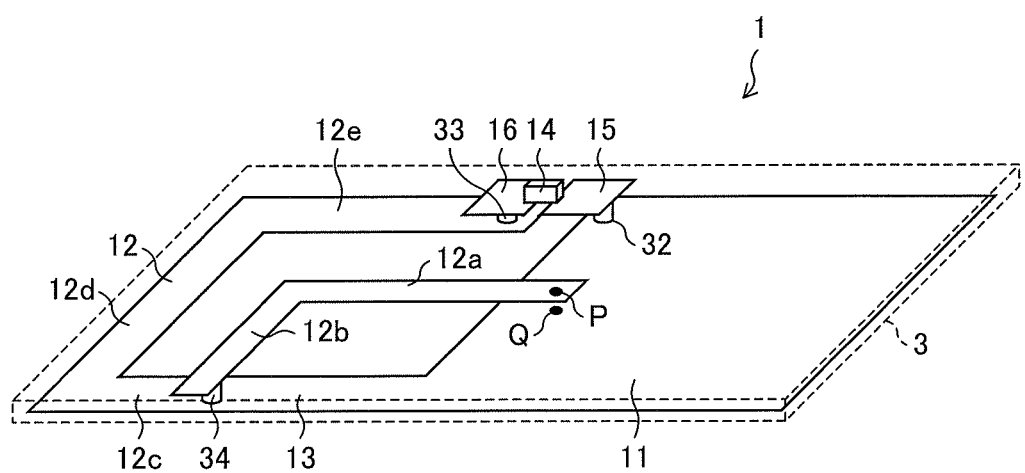

FIG. 11 is a perspective view illustrating a modified example of the antenna illustrated in FIG. 10.

Figure 12:
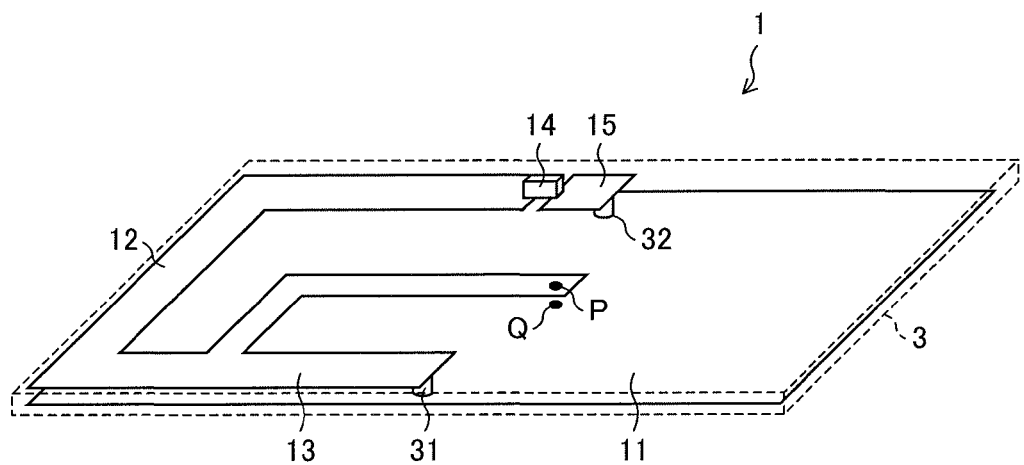

FIG. 12 is a perspective view illustrating another modified example of the antenna illustrated in FIG. 10.

Figure 13:
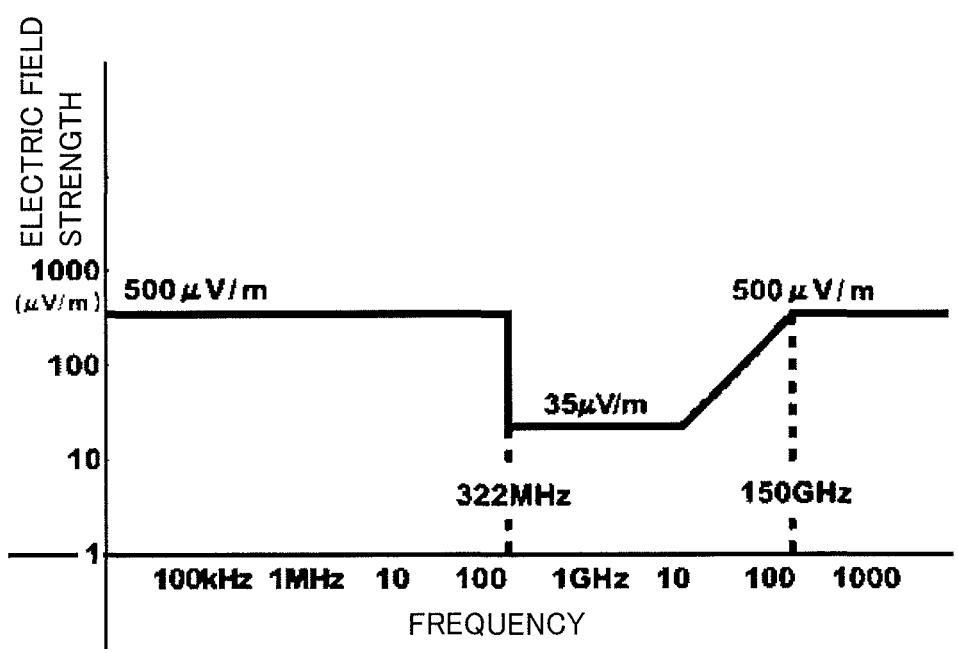

FIG. 13 is a graph showing the maximum electric field strength allowed for low power radio stations, which is specified in a law and a registration (Article 4 of the Radio Act and Article 6 of Regulations for Enforcement of the Radio Act) in Japan.

DESCRIPTION OF EMBODIMENTS

Embodiment 1

The following description will discuss Embodiment 1 (hereinafter referred to as "the present embodiment") of the present invention with reference to the drawings.

(Configuration of Antenna)

The following description discusses, with reference to FIG. 1, a configuration of an antenna 1 in accordance with the present embodiment. FIG. 1 is a top view illustrating the configuration of the antenna 1 in accordance with the present embodiment.

As illustrated in FIG. 1, the antenna 1 is an inverted F antenna including a ground plate 11, an antenna element 12, and a short-circuit section 13. The ground plate 11, the antenna element 12 and the short-circuit section 13 are provided on an identical plane (hereinafter also referred to as an "antenna formation plane") such that they do not overlap each other, and constitute a thin, planar antenna suitable for use in a wireless tag 2 (the outline of the wireless tag 2 is shown by a dotted line in FIG. 1).

The ground plate 11 is a planar (plate-like) conductor provided on the antenna formation plane. The ground plate 11 is also called a "planar ground". In the antenna 1, the ground plate 11 serves to enhance an electromagnetic wave emitted from the antenna element by Miller effect. According to the present embodiment, the ground plate 11 is a rectangular piece of conductive foil. The ground plate 11 has, at its edge, a recess 11a and a protrusion 11b. Specifically, the recess 11a is in a position between an end (the right end in FIG. 1) and middle of the short side 11A. An end part 12A of the antenna element 12 (described later) is positioned in an area defined by the recess 11a. On the other hand, the protrusion 11b is at an end (the left end in FIG. 1) of the short side 11A. An end part 12B of the antenna element 12 (described later) faces the protrusion 11b.

The antenna element 12 is a linear (wire-shaped) or ribbon-shaped (shaped like a ribbon) conductor provided on the antenna formation plane. The antenna element is also called a "radiating element". According to the present embodiment, the antenna element 12 is a bent ribbon-shaped piece of conductive foil. Specifically, the bent ribbon-shaped piece of conductive foil is constituted by (1) a first linear part 12a that extends from the end part 12A along the positive direction of a Y axis, (2) a second linear part 12b that extends, along the positive direction of an x axis, from an end of the linear part 12a which end is opposite to the end part 12A, (3) a third linear part 12c that extends, along the positive direction of the y axis, from an end of the second linear part 12b which end is opposite to the first linear part 12a, (4) a fourth linear part 12d that extends, along the negative direction of the x axis, from an end of the third linear part 12c which end is opposite to the second linear part 12b and (5) a fifth linear part 12e that extends, along the negative direction of the y axis, from an end of the fourth linear part 12d which end is opposite to the third linear part 12c. It should be noted here that the x axis and the y axis are parallel to the short side 11A and a long side 11B of the ground plate 11, respectively.

The end part 12A (in the present embodiment, the end part 12A is at an end of the first linear part 12a which end is opposite to the second linear part 12b) of the antenna element 12 is, as described earlier, positioned in the area defined by the recess 11a in the ground plate 11, and forms a power feed section with the recess 11a in the ground plate 11. In FIG. 1, a power feed point for the antenna element 12 and a power feed point for the ground plate 11 are represented as P and Q, respectively. The end part 12A of the antenna element 12 is hereinafter also referred to as a "power feed-side end part".

The end part 12B (in the present embodiment, the end part 12B is at an end of the fifth linear part 12e which end is opposite to the fourth linear part 12d) of the antenna element 12 faces the protrusion 11b of the ground plate 11 as described earlier, and is connected to the protrusion 11b via a capacitor 14. The capacitor 14 serves to achieve a lower operating frequency band (lower resonant frequency) of the antenna 1 without changing the length of the antenna element 12 (this is described later). In other words, the capacitor 14 serves to shorten the antenna element 12 without changing the operating frequency band of the antenna 1. More specifically, the capacitor 14 serves to reduce the total length ρ of the antenna element 12 from λ/4 to λ/8 or less without changing the operating frequency band of the antenna 1. The capacitor 14 is hereinafter also referred to as a "shortening capacitor".

The short-circuit section 13 is a linear or ribbon-shaped conductor provided on the antenna formation plane, and is arranged to short-circuit an intermediate portion 12C of the antenna element 12 and an edge of the ground plate 11. The short-circuit section 13 serves to match the input impedance of the antenna 1 to the output impedance of an IC chip 21 (described later). According to the present embodiment, the intermediate portion 12C is a portion between the second linear part 12b and the third linear part 12c, and the short-circuit section 13a is a ribbon-shaped piece of conductive foil provided along a normal to the short side 11A of the ground plate 11 extending from the intermediate portion 12C. With this configuration, a power feed line part (a part extending from the end part 12A to the intermediate portion 12C) of the antenna element 12 is positioned in a region defined by the ground plate 11, the short-circuit section 13 and a main part (a part extending from the intermediate portion 12C to the end part 12B) of the antenna element 12. It should be noted that the "intermediate" as in the intermediate portion 12C means that the intermediate portion 12C lies somewhere between the end part 12A and the end part 12B, and does not necessarily mean that it is in the midpoint between the end part 12A and the end part 12B.

The ground plate 11, the antenna element 12 and the short-circuit section 13 can be formed, for example, integrally on a PET (polyethylene terephthalate) film, which is a planar substrate, by printing with conductive silver paste. It should be evident that such a configuration makes it possible to realize an extremely-thin antenna 1 that is suitable for use in the wireless tag 2. Examples of the material for the planar substrate not only include PET but also include various dielectric materials such as glass epoxy and polyimide.

When the antenna 1 is mounted in or on the wireless tag 2, the antenna 1 is provided so that (i) the long side 11B of the ground plate 11 is parallel to a long side 2B (e.g., 85.6 mm) of the wireless tag 2 and (ii) the antenna element 12 and the short-circuit section 13 are positioned in a region defined by the short side 11A of the ground plate 11 and a short side 2A (e.g., 54.0 mm) of the wireless tag 2 (see FIG. 1). The reason why the antenna 1 can be placed like this is that the total length ρ of the antenna element 12 is reduced to λ/8 or less by the effect of the capacitor 14.

In fact, when the antenna 1 is to be operated at 315 MHz, absent the shortening capacitor 14, the total length ρ of the antenna element 12 should be approximately 25 cm (equivalent to λ/4). Therefore, it is difficult to place the antenna element 12 within the above-mentioned region regardless of how the antenna element 12 is bent. On the other hand, in a case where there is provided the shortening capacitor 14, the total length ρ of the antenna element 12 can be approximately 10 cm (equivalent to $\lambda/10$). Therefore, by bending the antenna element 12 as described earlier, it is possible to easily place the antenna element 12 within the above-mentioned region.

Furthermore, when the antenna 1 is mounted in or on the wireless tag 2, the IC chip 21 and a paper battery 22, which are to be mounted in or on the wireless tag 2 together with the antenna 1, may be arranged so as to overlap the power feed points P and Q and the ground plate 11, respectively (see FIG. 1). Since the IC chip 21 overlaps the power feed points P and Q, the IC chip 21 can be connected directly to the power feed points P and Q without a coaxial cable etc. Accordingly, high-frequency signals can be more efficiently exchanged between the antenna and the IC chip. Furthermore, since the paper battery 22 overlaps the ground plate 11, the paper battery 22 is prevented from overlapping the antenna element 12 which lies within the above-mentioned region. This makes it possible to prevent, for example, the following situations: (i) electric current induced in the paper battery 22 cancels an electric field around the antenna element 12 and thereby radiant intensity decreases and (ii) the paper battery 22 causes a distortion of an electromagnetic field around the antenna element 12 and thereby the radiation from the antenna element 12 becomes nonuniform. The battery mounted in or on the wireless tag 2 is not limited to the paper battery 22, and may be some other battery such as a button battery. Also in this case, the ground plate 11 may be placed so as to overlap the button battery.

The antenna 1 in accordance with the present embodiment is an inverted F antenna including the ground plate 11 and the antenna element 12 plus the short-circuit section 13. Note, however, that the antenna 1 is not limited to such. Specifically, the antenna 1 in accordance with the present embodiment can be an inverted L antenna which includes the ground plate 11 and the antenna element 12 but does not include the short-circuit section 13. Also in this case, the total length ρ of the antenna element 12 can be reduced by the effect of the shortening capacitor 14.

(Shortening Capacitor)

A main feature of the antenna 1 in accordance with the present embodiment resides in the shortening capacitor 14, which bridges the ground plate 11 and the end part 12B of the antenna element 12 which end part is opposite to the power feed-side end part. The shortening capacitor 14 makes it possible to reduce the total length ρ of the antenna element 12 without changing the operating frequency band of the antenna 1. In other words, it is possible to cause the operating frequency band of the antenna 1 to shift lower without changing the total length ρ of the antenna element 12. It should be noted here that, as for the antenna element 12 illustrated in FIG. 1, the total length ρ of the antenna element 12 is the sum of the lengths of the five linear parts 12a to 12e.

Effects of the shortening capacitor 14 are described in more detail with reference to FIG. 2. In the following description, a monopole antenna is taken as an example for convenience of description. Note, however, that the same applies to any kind of monopole-type antenna (i.e., antenna that includes a ground plate and an antenna element and operates on the same principle as a monopole antenna) such as an inverted F antenna and an inverted L antenna.

Figure 2:
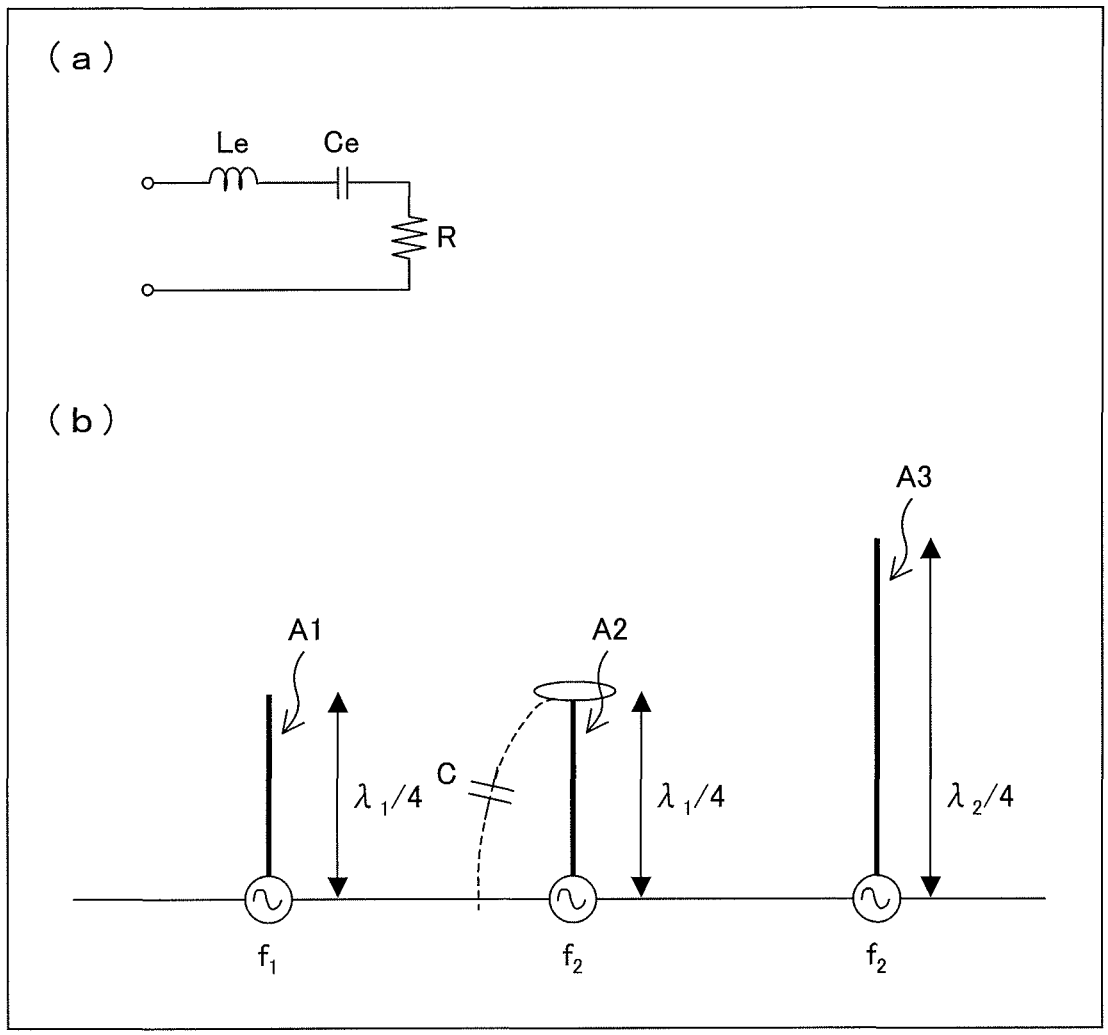
FIG. 2 is for explaining the effects of a shortening capacitor included in the antenna illustrated in FIG. 1. (a) of FIG. 2 is an equivalent circuit of the antenna. (b) of FIG. 2 illustrates a monopole antenna A1, an antenna A2 obtained by adding the shortening capacitor to the monopole antenna A1, and a monopole antenna A3 having the same resonant frequency as the antenna A2.

As has been well-known, a monopole antenna is equivalent to a series RLC resonant circuit illustrated in (a) of FIG. 2. In (a) of FIG. 2, R is radiation resistance, $L_e$ is effective inductance, and $C_e$ is effective capacitance. The effective inductance $L_e$ and the effective capacitance $C_e$ depend on the material and shape etc. of the antenna element. Impedance Z is given by Equation (1), and resonant frequency $f_o$ is given by Equation (2):

[Math 1]

$$Z = R + j\left(\omega L_e - \frac{1}{\omega C_e}\right)[\Omega] \quad (1)$$

[Math 2]

$$f_o = \frac{1}{2\pi\sqrt{L_e C_e}}[Hz] \quad (2)$$

For understanding of the effects of the shortening capacitor 14, three antennas A1 to A3 illustrated in (b) of FIG. 2 are considered.

The antenna A1 is a monopole antenna having an effective inductance $L_1$ and an effective capacitance $C_1$. The resonant frequency $f_1$ of the antenna A1 is given by Equation (3). The total length $\rho_1$ of an antenna element of the antenna A1 is $\rho_1=\lambda_1/4$, where $\lambda_1=c/f_1$ (c is the speed of light).

[Math 3]

$$f_1 = \frac{1}{2\pi\sqrt{L_1 C_1}} \quad (3)$$

The antenna A2 is different from the antenna A1 in that a shortening capacitor, which has a capacitance C, is added between a ground plate and an end part of the antenna element which end part is opposite to the power feed-side end part. The addition of the shortening capacitor is realized by providing a disc at the end part of the antenna element which end part is opposite to the power feed-side end part such that the disc and the ground plate have a stray capacitance C between them. Since the effective inductance $L_2$ of the antenna A2 is $L_2=L_1$ and the effective capacitance $C_2$ of the antenna A2 is $C_2=C_1+C$, the resonant frequency $f_2$ of the antenna A2 is given by Equation (4). The total length $\rho_2$ of the antenna element of the antenna A2 is $\rho_2=\lambda_1/4$, which is the same as the antenna A1.

[Math 4]

$$f_2 = \frac{1}{2\pi\sqrt{L_1(C_1 + C)}} < f_1 \quad (4)$$

The antenna A3 is a monopole antenna having the resonant frequency $f_2$ which is the same as the antenna A2. The total length p3 of an antenna element of the antenna A3 is $\rho_3=\lambda_2/4$, where $\lambda_2=c/f_2$. Since $f_2<f_1$ as shown in Equation (4), the total length, $\rho_3=c/(4f_2)$, of the antenna element of the antenna A3 is larger than the total length, $\rho1=c/(4f_1)$, of the antenna element of the antenna A1.

The comparison between the antenna A2 and the antenna A3 shows that, by adding the shortening capacitor, it is possible to reduce the total length of the antenna element without changing the resonant frequency. Furthermore, the comparison between the antenna A2 and the antenna A1 shows that, by adding the shortening capacitor, it is possible to cause the resonant frequency to shift lower without changing the total length of the antenna element.

Figure 3:
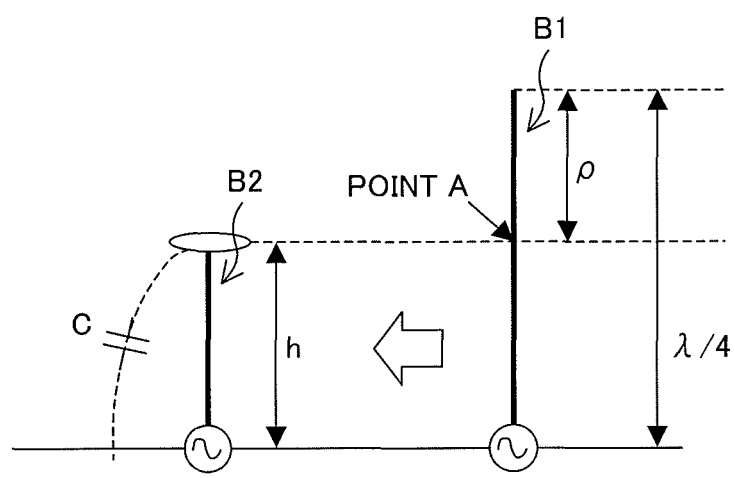
FIG. 3 is for explaining a capacitance of the shortening capacitor included in the antenna illustrated in FIG. 1.

The following description discusses, with reference to FIG. 3, how to determine the capacitance of the shortening capacitor 14.

Consider that the total length of an antenna element of a monopole antenna is reduced from $\lambda/4$ [m] to h [m] (see FIG. 3). In FIG. 3, an antenna B1 is a monopole antenna having an antenna element whose total length is not shortened and is $\lambda/4$, whereas an antenna B2 is a monopole antenna having an antenna element whose total length has been shortened to h. Assuming that the antenna element is a straight wire that is perpendicular to a ground surface (infinite ground plate) and has a circular cross section d [m] in diameter, the capacitance C (F) of the shortening capacitor to be added is given by Equation (5):

[Math 5]

$$C = \frac{1}{120\pi f\left\{\ln\left(\frac{4h}{d}\right) - 1\right\}}\tan\left\{\frac{2\pi}{\lambda}\left(\frac{\lambda}{4} - h\right)\right\}[F] \quad (5)$$

where $\lambda$ [m] is operating wavelength (resonant wavelength), and f [Hz] is operating frequency (resonant frequency). The wavelength $\lambda$ and the frequency f are in the following relationship: $f=c/\lambda$ where c [m/sec] is the speed of light. Equation (5) is obtained in the following manner.

As described earlier, an antenna is equivalent to the series RLC resonant circuit illustrated in (a) of FIG. 2. Assuming that a point at a distance of $\rho=\lambda/4-h$ from the top of the antenna is point A, the input impedance Z [$\Omega$] of a part extending from point A to the top of the antenna is given by Equation (6) in accordance with a theoretical formula of a high-frequency transmission path with an open end:

[Math 6]

$$Z = -jZ_0 \cot\beta\rho [\Omega] \quad (6)$$

where $Z_0$ is characteristic impedance [$\Omega$] of the transmission path, and $\beta$ is the number of waves $2\pi/\lambda$ [1/m]. It is known that the characteristic impedance $Z_0$ of a straight wire that is perpendicular to a ground surface and has a circular cross section d [m] in diameter is approximated with Equation (7):

[Math 7]

$$Z_0 = 60\left\{\ln\left(\frac{4h}{d}\right) - 1\right\}[\Omega] \quad (7)$$

On the other hand, the impedance Z [$\Omega$] of a capacitor having a capacitance C [F] is, as has been well-known, given by Equation (8) with angular frequency $\omega$ [rad/sec]:

[Math 8]

$$Z = -j\frac{1}{\omega C}[\Omega] \quad (8)$$

In order to reduce the total length of the antenna element from $\lambda/4$ to h, it is only necessary to match the impedance Z of the shortening capacitor to be added to the input impedance Z shown in Equation (6). That is, the capacitance C of the shortening capacitor to be added is, assuming that the right side of Equation (8) is equal to the right side of Equation (6) into which Equation (7) is substituted, calculated by the following equations:

[Math 9]

$$-j\frac{1}{\omega C} = -jZ_0\cot\beta\rho \quad (9)$$

$$C = \frac{1}{\omega Z_0}\cot\beta\rho = \frac{1}{120\pi f\left\{\ln\left(\frac{4h}{d}\right) - 1\right\}}\tan\left\{\frac{2\pi}{\lambda}\left(\frac{\lambda}{4} - h\right)\right\}[F]$$

It should be noted that Equation (5) gives the capacitance C of the shortening capacitor to be added in a case where the antenna element is a straight wire that is perpendicular to a ground surface and has a circular cross section d [m] in diameter. However, even in a case where a bent antenna element 12 is provided on a plane where the ground plate 11 is provided like the antenna 1 in accordance with the present embodiment, Equation (5) is sufficient to estimate the capacitance of the shortening capacitor 14 to be added.

For example, the capacitance of the shortening capacitor 14 can be set at Co ±50% (i.e., not less than 0.5×Co but not greater than 1.5×Co) where Co [F] is a capacitance C obtained by substituting d=W into Equation (5), assuming that the mean width of the antenna element 12 is W [m]. Provided that the capacitance of the shortening capacitor 14 falls within this range, it is almost always possible to reduce the total length of the antenna element 12 from $\lambda/4$ [m] to h [m]. The reason why the Co has a margin of ±50% is that the effective capacitance of the antenna 1 may deviate from a value of theoretical calculation depending on the material, shape (whether the antenna element 12 is bent or not or how it is bent), and thickness of the antenna element 12.

It is needless to say that, by obtaining by experiment an approximate equation for the characteristic impedance $Z_0$ of the antenna element 12 to be mounted and using the approximate equation instead of Equation (7), it is possible to more accurately determine the capacitance of the shortening capacitor 14 to be added.

Although the configuration discussed in the present embodiment was a configuration in which (i) a single capacitor having a particular capacitance is added and (ii) this capacitor serves as the shortening capacitor 14 bridging the ground plate 11 and the antenna element 12, this does not imply any limitation. Specifically, it is also possible to employ a configuration in which (a) a plurality of capacitors having different capacitances are added and (b) one of the plurality of capacitors serves as the shortening capacitor 14 bridging the ground plate 11 and the antenna element 12. Such a configuration allows a user to selectively use a plurality of operating frequencies of the antenna 1.

(Other Features)

The following description discusses, with reference to FIGS. 4 and 5, other features of the antenna 1 in accordance with the present embodiment.

As described earlier, the antenna 1 in accordance with the present embodiment employs a configuration (hereinafter referred to as "Configuration A") in which (i) there is the recess 11a in the short side 11A of the ground plate 11 and (ii) the end part 12A of the antenna element 12 is positioned in the area defined by the recess 11a (see (a) of FIG. 4 and FIG. 1). Therefore, it is possible to provide the power feed points P and Q away from a main part (a part extending from the end part 12B to the intermediate portion 12C) of the antenna element 12, as compared to a configuration (hereinafter referred to as "Configuration B") in which the end part 12A of the antenna element 12 merely faces the short side 11A of the ground plate 11 (see (b) of FIG. 4).

This means that, in a case where the IC chip 21 is to be directly connected to the power feed points P and Q, the IC chip 21 can be positioned away from the main part of the antenna element 12. That is, by employing Configuration A illustrated in (a) of FIG. 4, it is possible to avoid a deterioration of antenna characteristics that may occur when the IC chip 21 is provided within an electromagnetic field around the main part of the antenna element 12. It should be noted however that, in a case where it is not necessary to take into consideration the effect of the IC chip 21 on the antenna characteristics, Configuration B illustrated in (b) of FIG. 4, in which the ground plate 11 can be easily made, may be employed.

Furthermore, as described earlier, the antenna 1 in accordance with the present embodiment employs a configuration in which the power feed line part (the part extending from the end part 12A to the intermediate portion 12C) of the antenna element 12 is positioned in a region defined by the ground plate 11, the short-circuit section 13 and the main part (the part extending from the intermediate portion 12C to the end part 12B) of the antenna element 12 (see (a) of FIG. 5 and FIG. 1). Accordingly, even in a case where an external conductor makes contact with the edges of the wireless tag 2 (e.g., even in a case where the wireless tag 2 is held in a user's hand), effects of the external conductor on the power feed line part of the antenna element 12 are suppressed.

Furthermore, the antenna 1 in accordance with the present embodiment employs a configuration in which the short-circuit section 13 is connected to the short side 11A of the ground plate 11 in a position between an end (right end) and the middle of the short side 11A (see (a) of FIG. 5 and FIG. 1). Therefore, it is possible to provide the third linear part 12c of the antenna element 12 away from the edges (especially a long side 2B') of the wireless tag 2 as indicated by arrow A, as compared to a configuration in which the short-circuit section 13 is connected at the end of the short side 11A. Accordingly, even in a case where an external conductor makes contact with the edges (especially the long side 2B') of the wireless tag 2 (e.g., even in a case where the wireless tag 2 is held in a user's hand), effects of the external conductor on antenna characteristics are suppressed.

As one modified example of the antenna 1 in accordance with the present embodiment, it is also possible to employ a configuration in which the protrusion 11b is in a position between an end (left end) and middle of the short side 11A of the ground plate 11 (see (b) of FIG. 5). With this configuration, it is possible to provide the fifth linear part 12e of the antenna element 12 away from the edges (especially a long side 2B) of the wireless tag 2 as indicated by arrow B. Accordingly, also in this case, effects of the external conductor on antenna characteristics are suppressed.

Alternatively, as another modified example of the antenna 1 in accordance with the present embodiment, it is also possible to employ a configuration in which (i) the short-circuit section 13 is connected to the short side 11A of the ground plate 11 in a position between an end (right end) and middle of the short side 11A and (ii) the protrusion 11b is in a position between an end (left end) and middle of the short side 11A of the ground plate 11 (see (c) of FIG. 5). With this configuration, it is possible to (i) provide the third linear part 12c of the antenna element 12 away from the edges (especially the long side 2B') of the wireless tag 2 as indicated by arrow A and (ii) provide the fifth linear part 12e of the antenna element 12 away from the edges (especially the long side 2B) of the wireless tag 2 as indicated by arrow B. Accordingly, also in this case, effects of the external conductor on antenna characteristics are suppressed.

Although the antenna 1 in accordance with the present embodiment includes the antenna element 12 having a shape constituted by the five linear parts 12a to 12e as described above, this does not imply any limitation. That is, for example, at least part of the antenna element 12 may have a meander shape. In a case where the antenna element 12 has a meander shape, the total length ρ of such an antenna element 12 can be increased without increasing the space occupied by the antenna element 12. Conversely, it is possible to reduce the size of the antenna 1 without reducing the total length ρ of the antenna element 12. That is, it is possible to reduce the size of the antenna 1 without shortening the resonant wavelength (without raising the resonant frequency) of the antenna 1. It should be noted however that, in a case where the antenna element 12 has a meander shape, electromagnetic fields around the antenna element 12's components that are close to each other may interfere with each other so as to cancel out, and this may result in a reduction in antenna gain. With the antenna element 12 having a shape constituted by the five linear parts 12a to 12e, it is possible to avoid such a reduction in antenna gain.

EXAMPLES

Lastly, with reference to FIGS. 6 and 7, the following description shows that it is possible to cause an antenna 1, which is capable of being mounted in or on a wireless tag 2 having a size of an ID-1 card (85.6 mm×54.0 mm), to operate in the 315 MHz band by adding a shortening capacitor 14 having an appropriate capacitance.

FIG. 6 is a top view illustrating a specific shape of the antenna 1 in accordance with the present example. The dimensions of the ground plate 11, the antenna element 12, and the short-circuit section 13 are as shown in FIG. 6. As illustrated in FIG. 6, the antenna 1 is arranged such that the ground plate 11 and the antenna element 12 are provided within a rectangular region of 85.6 mm×54.0 mm, more specifically, within a rectangular region of 84.0 mm×52.0 mm, so that the antenna 1 is capable of being mounted in or on the wireless tag 2 having the size of an ID-1 card.

When the antenna 1 is mounted in or on the wireless tag 2, such a wireless tag 2 has a cross section made up of a package (back), the paper battery 22, a membrane substrate including the antenna 1, and the package (front) which are stacked in this order. The thickness of the package is 0.1 mm, the thickness of the paper battery 22 is 0.5 mm, and the thickness of the membrane substrate is 0.1 mm. Therefore, the minimum thickness of the wireless tag 2 as a whole is 0.8 mm. Therefore, it is possible to realize a card-shaped active tag having a thickness of as small as that of a passive tag (which typically has a thickness of approximately 1 mm) such as an e-cash card.

The capacitance C of the shortening capacitor 14, which is to cause the antenna 1 having the shape illustrated in FIG. 6 to resonate at 315 MHz, can be calculated in accordance with the foregoing Equation (5). Specifically, substitution of f=315 MHz, wavelength λ=0.952 m, h=0.098 m, and d=0.003 m into Equation (5) yields Co=2.87 pF. This shows that it is only necessary that the capacitance C of the shortening capacitor 14 be approximately 2.87 pF (±50%).

This is demonstrated by the experimental results shown in FIG. 7. FIG. 7 shows Smith charts for the results obtained by measuring S parameters (S11) of the antenna 1 in accordance with the present example at 250 MHz to 500 MHz. (a) of FIG. 7 is a Smith chart when no shortening capacitor 14 is provided. (b) of FIG. 7 is a Smith chart when the capacitance C of the shortening capacitor 14 is 2 pF. (c) of FIG. 7 is a Smith chart when the capacitance C of the shortening capacitor 14 is 3 pF. (d) of FIG. 7 is a Smith chart when the capacitance C of the shortening capacitor 14 is 4 pF. In these Smith charts, an intersection of S parameter and the real axis represents a resonant frequency. The labels "0", "50" and "∞" on the real axis represent "0Ω", "50Ω" and "∞Ω", respectively.

In a case where no shortening capacitor 14 is provided, the antenna 1 does not have any resonant frequency in the range of 250 MHz to 500 MHz (see (a) of FIG. 7). On the other hand, in a case where the capacitance of the shortening capacitor 14 is 2 pF, the antenna 1 resonates at a frequency (367.5 MHz) higher than 315 MHz (see (b) of FIG. 7). In a case where the capacitance of the shortening capacitor 14 is 3 pF, the antenna 1 resonates at 315 MHz (see (c) of FIG. 7). In a case where the capacitance of the shortening capacitor 14 is 4 pF, the antenna 1 resonates at a frequency (higher than 450 MHz) much higher than 315 MHz (see (d) of FIG. 7). That is, the results show that, with the use of the shortening capacitor 14 having a capacitance of 3 pF, it is possible to cause the antenna 1 in accordance with the present example to operate at 315 MHz.

In a case where the resonant frequency f is 315 MHz, a corresponding wavelength λ=c/f (c is the speed of light) is 95.2 cm. Therefore, assuming that no shortening capacitor 14 is provided, the total length ρ of the antenna element 12 should be λ/4=23.8 cm. On the other hand, when the shortening capacitor 14 having a capacitance of 3 pF is added, the total length ρ of the antenna element 12 can be reduced to 10.8 cm (see FIG. 6). As such, by adding the shortening capacitor 14 having a capacitance of 3 pF, it is possible to realize an antenna 1 whose operating frequency band includes 315 MHz (whose resonant frequency is 315 MHz) and which is capable of being mounted in or on the wireless tag 2 having the size of an ID-1 card.

It should be noted that, although the ground plate 11 of the present example is a rectangular conductor plate of 52 mm×54 mm, the ground plate 11 is not limited to such. That is, the size and shape of the ground plate 11 may be changed as appropriate, provided that the ground plate 11 functions as a ground surface (infinite ground plate) and its functions are not impaired.

It should be further noted that, although the present example is based on the assumption that the paper battery 22 and the ground plate 11 overlap each other, the paper battery 22 and the ground plate 11 do not necessarily have to overlap each other, provided that effects of current induced in the paper battery 22 are so small that they can be ignored. For example, in a case where the ground plate 11 is in the shape of a rectangle of 52 mm×12 mm and the paper battery 22 is in the shape of a rectangle of 48 mm×38 mm, such ground plate 11 and paper battery 22 may be arranged next to each other without overlapping each other. In this case, the area of the ground plate 11 is smaller than that in the case of the configuration illustrated in FIG. 6. Therefore, it is possible to significantly reduce material costs for the antenna 1 (costs for conductive foil which is a main material for the antenna 1). Furthermore, since the ground plate 11 and the paper battery 22 do not have to be stacked together like the configuration illustrated in FIG. 6, it is possible to reduce the thickness of the wireless tag 2 to equal to or less than 0.76 mm, which is a value specified in ISO/IEC7810. In fact, assuming that the thickness of the package is 0.1 mm, the thickness of the paper battery 22 is 0.5 mm and the thickness of the membrane substrate is 0.1 mm, the minimum thickness of the wireless tag 2 as a whole is 0.7 mm.

Embodiment 2

The following description will discuss, with reference to the drawings, Embodiment 2 (hereinafter referred to as the present embodiment) of the present invention.

The following description discusses, with reference to FIG. 8, a configuration of an antenna 1 in accordance with the present embodiment. FIG. 8 is a top view illustrating the configuration of the antenna 1 in accordance with the present embodiment.

The antenna 1 is an inverted F antenna including a ground plate 11, an antenna element 12 and a short-circuit section 13. The ground plate 11, the antenna element 12 and the short-circuit section 13 are provided on an identical plane without overlapping each other, and constitute a thin, planar antenna suitable for use in a wireless tag as is the case with Embodiment 1.

The ground plate 1 is, as is the case with Embodiment 1, a planar conductor provided on the antenna formation plane. According to the present embodiment, the ground plate 11 is a rectangular piece of conductive foil having a rectangular cutout 11C at a corner (upper-right corner in FIG. 8) thereof. The ground plate 1 of the present embodiment is the same as that of Embodiment 1 in that (i) it has a side 11A, a side 11C1 (i.e., of the two sides that define the cutout 11C, one that is parallel to the side 11A) and a side 11C2 (i.e., of the two sides that define the cutout 11C, one that is perpendicular to the side 11A) and (ii) of these sides constituting an edge having a stair-step appearance, the side 11A has a protrusion 11*b* at its end (left end in FIG. 8).

The antenna element 12 is, as with Embodiment 1, a ribbon-shaped conductor provided on the antenna formation plane. The antenna element 12 used in the present embodiment is a ribbon-shaped piece of conductive foil constituted by (1) a first linear part 12*a* that extends from an end part 12A along the positive direction of the y axis, (2) a second linear part 12*b* that extends, along the negative direction of the x axis, from an end of the linear part 12*a* which end is opposite to the end part 12A, and (3) a third linear part 12*c* that extends, along the negative direction of the y axis, from an end of the second linear part 12*b* which end is opposite to the first linear part 12*a*.

The antenna element 12 has an end part 12B (in the present embodiment, the end part 12B is at an end of the third linear part 12*c* which end is opposite to the second linear part 12*b*) which faces the protrusion 11*b* of the ground plate 11. The end part 12B is connected to the protrusion 11*b* of the ground plate 11 via a shortening capacitor 14. Also in the present embodiment, the shortening capacitor 14 serves to reduce the total length p of the antenna element 12 without causing the operating frequency band of the antenna 1 to shift higher.

The short-circuit section 13 is, as with Embodiment 1, a ribbon-shaped conductor provided on the antenna formation plane, and is arranged to short-circuit the power feed-side end part 12A of the antenna element 12 and an edge of the ground plate 11. The short-circuit section 13 used in the present embodiment is a ribbon-shaped piece of conductive foil provided along a normal to the side 11C1 of the ground plate 11 extending from the power feed-side end part 12A of the antenna element 12.

According to the antenna 1 in accordance with the present embodiment, a region defined by the edge of the ground plate 11, the antenna element 12 and the short-circuit section 13 is divided into two regions R1 and R2 by a line connecting the power feed points. The first region R1 is a region defined by the edge (specifically the side 11A) of the ground plate 11, the antenna element 12 and the line connecting the power feed points, whereas the second region R2 is a region defined by the edge (specifically the side 11C1 and the side 11C2) of the ground plate 11, the short-circuit section 13 and the line connecting the power feed points.

With this configuration, the antenna 1 in accordance with the present embodiment not only has a resonant frequency f0 that depends on the total length ρ of the antenna element 12 and the capacitance C of the shortening capacitor 14 but also has two resonant frequencies f1 and f2 that depend on the shapes of the two regions R1 and R2. This is described with reference to FIG. 9 on the basis of the principle of complementarity.

According to the principle of complementarity, the two regions R1 and R2 function as an antenna equivalent to a dipole antenna including two antenna elements R1' and R2' that are congruent with the two regions R1 and R2, respectively (see (a) of FIG. 9). That is, the antenna 1 has the resonant frequency f1 which is equivalent to the resonant frequency of the dipole antenna including the antenna elements R1' and R2'.

Furthermore, according to the principle of complementarity, the two regions R1 and R2 function as an antenna equivalent to a monopole antenna including a single antenna element R' that is congruent with a region R1∪R2 obtained by uniting the two regions R1 and R2 (see (b) of FIG. 9). That is, the antenna 1 has the resonant frequency f2 which is equivalent to the resonant frequency of the monopole antenna including the antenna element R'.

As described above, the antenna 1 in accordance with the present embodiment functions as a multiple resonant antenna (multifrequency antenna) having three resonant frequencies. This is advantageous because, for example, such an antenna 1 can be used in countries which require different operating frequency bands.

Embodiment 3

Although the ground plate 11 and the antenna element 12 are provided on an identical plane in the foregoing embodiments, the present invention is not limited to such. That is, it is also possible to employ a configuration in which the ground plate 11 and the antenna element 12 are provided on different planes. The following description discusses such an embodiment as Embodiment 3 (hereinafter referred to as "the present embodiment") of the present invention.

(Configuration of Antenna)

FIG. 10 is a perspective view illustrating a configuration of an antenna 1 in accordance with the present embodiment. The antenna 1 in accordance with the present embodiment is an inverted F antenna including a ground plate 11, an antenna element 12 and a short-circuit section 13, and is mounted on a planar substrate 3. Examples of the material for the planar substrate 3 not only include PET but also include various dielectric materials such as glass epoxy and polyimide. Because the antenna 1 is for use in a wireless tag 2 having the size of an ID-1 card (85.6 mm×54.0 mm), it is preferable that the size of each of the front and back surfaces of the substrate 3 is not more than 85.6 mm×54.0 mm and that the thickness of the substrate 3 is not more than 5.0 mm.

The antenna 1 in accordance with the present embodiment is different from the antenna 1 in accordance with Embodiment 1 in that the ground plate 11 and the antenna element 12 are provided on different planes. More specifically, the ground plate 11 is provided on the back surface of the substrate 3, whereas the antenna element 12 is provided on the front surface of the substrate 3. A short-circuit section 13 is provided on the front surface of the substrate 3 where the antenna element 12 is provided. Furthermore, there is provided a land 15 which is electrically connected to the ground plate 11. A shortening capacitor 14 is provided on the front surface of the substrate 3 so as to bridge the land 15 and an end of the antenna element 12.

The ground plate 11 is formed on the back surface of the substrate 3 by, for example, printing with conductive silver paste containing a small percentage of silver particles. On the other hand, the antenna element 12 is formed on the front surface of the substrate 3 by, for example, printing with conductive silver paste containing a large percentage of silver particles. As such, since the ground plate 11 and the antenna element 12 are formed on the respective different planes, it is possible to print the ground plate 11 and the antenna element 12 with different materials.

The substrate 3 has a through hole 31 in a position that overlaps an end of the short-circuit section 13. The through hole 31 extends from the front surface to the back surface of the substrate 3, and is filled with a conductive material. The conductive material filling the through hole provides an electrical connection between the short-circuit section 13 and the ground plate 11. The substrate 3 further has a through hole 32 in a position that overlaps the land 15. The through hole 32 extends from the front surface to the back surface of the substrate 3, and is filled with a conductive material. The conductive material filling the through hole 32 provides an electrical connection between the land 15 and the ground plate 11.

As described above, according to the antenna 1 in accordance with the present embodiment, the ground plate is formed on a first plane (the back surface of the substrate 3) whereas the antenna element 12 is formed on a second plane (the front surface of the substrate 3) that is parallel to the first plane. Therefore, when the distance (the thickness of the substrate 3) between the first plane (the back surface of the substrate 3) and the second plane (the front surface of the substrate 3) is smaller than the thickness of the wireless tag 2, it is possible to realize a thin antenna suitable for use in the wireless tag 2, as with the antenna 1 in accordance with Embodiment 1.

Although the antenna 1 illustrated in FIG. 10 is configured such that the entire antenna element 12 is provided on the front surface of the ground plate 3, the present embodiment is not limited to such. That is, the following configuration is also encompassed in the present embodiment: part of the antenna element 12 is provided on the front surface of the substrate 3 and the other part of the antenna element 12 is provided on the back surface of the substrate 3. Such a modified example will be described later with reference to FIG. 11.

Furthermore, although the antenna 1 illustrated in FIG. 10 is configured such that only part (an end portion on the power feed point P side) of the antenna element 12 faces the ground plate 11, the present embodiment is not limited to such. That is, the following configuration is also encompassed in the present embodiment: the entire antenna element 12 faces the ground plate 11. Such a modified example will be described later with reference to FIG. 12.

In a case where the substrate 3 is a multilayer substrate, instead of the configuration in which both the ground plate 11 and the antenna element 12 are provided on an outer layer(s) (the front surface and/or the back surface) of the substrate 3, the following configuration may be employed: the ground plate 11 and/or the antenna element 12 is/are provided on an inner layer(s) of the substrate 3. Specifically, the following configuration may be employed: the ground plate 11 is provided on a first layer that is an outer or inner layer of the substrate 3, and a whole or part of the antenna element 12 is provided on a second layer that is an outer or inner layer of the substrate 3 other than the first layer.

Even in a case where any of the above configurations is employed, provided that the distance between the first plane where the ground plate 11 is provided and the second plane where the antenna element 12 is provided is small enough, it is possible to obtain antenna characteristics equivalent to those of the antenna 1 in accordance with Embodiment 1. For example, provided that the distance between the first plane where the ground plate 11 is provided and the second plane where the antenna element 12 is provided is equal to or less than 5% the total length ρ of the antenna element 12, effects of the ground plate 11 and the antenna element 12 provided on the different planes on the antenna characteristics are negligible. Accordingly, it is possible to obtain antenna characteristics equivalent to those of the antenna 1 in accordance with Embodiment 1.

Modified Example 1

FIG. 11 is a perspective view illustrating Modified Example 1 of the antenna 1 in accordance with the present embodiment. The antenna 1 illustrated in FIG. 11 is configured such that (i) a power feed line part, which is constituted by two linear parts 12a and 12b, of an antenna element 12 is provided on the front surface of a substrate 3 and (ii) a main part, which is constituted by three linear parts 12c to 12e, of the antenna element 12 is provided on the back surface of the substrate 3.

On the back surface of the substrate 3, there is provided a short-circuit section 13 in addition to a ground plate 11 and the main part of the antenna element 12. On the front surface of the substrate 3, there are provided two lands 15 and 16 in addition to the power feed line part of the antenna element 12. The land 15 is electrically connected to the ground plate 11 via a conductive material which fills a through hole 32, whereas the land 16 is electrically connected to an end of the antenna element 12 via a conductive material which fills a through hole 33. A shortening capacitor 14 is provided on the front surface of the substrate 3 so as to bridge the land 15 and the land 16.

Modified Example 2

In the configurations illustrated in FIGS. 10 and 11, the antenna element 12 faces the ground plate 11 only at the power feed point P-side end. When the area of a part of the antenna element 12 which part faces the ground plate is small enough like this, that is, when a stray capacitance $C_s$ between the antenna element 12 and the ground plate 11 is negligible, the capacitance C of the shortening capacitor 14 that is to be added in order to reduce the total length of the antenna element 12 from λ/4 to h is given by Equation (5), as with the case with Embodiment 1.

It should be noted, however, that a configuration in which the stray capacitance $C_s$ between the ground plate 11 and the antenna element 12 is not negligible should not be excluded from the present embodiment. For example, a configuration illustrated in FIG. 12, i.e., the configuration in which the ground plate 11 covers the back surface (substantially entire back surface) of the substrate 3, is also encompassed in the present embodiment.

In a case where the entire antenna element 12 faces the ground plate 11 as illustrated in FIG. 12, the stray capacitance $C_s$ between the ground plate 11 and the antenna element 12 is not negligible. The stray capacitance $C_s$ is in series with an effective capacitance $C_e$. Therefore, an effective capacitance $C_e'$, which takes into consideration the stray capacitance $C_s$, is represented by $C_e' = (C_e \times C_s)/(C_e + C_s) < C_e$. That is, in this case, the shortening capacitor 14 to be added is a capacitor having a larger capacitance than that is given by Equation (5).

This is described in more detail as follows. Specifically, when the shortening capacitor 14 having a capacitance $C_l$ is provided at an end of the antenna element 12, a resonant frequency of the antenna 1 is represented by the following equation:

$$f_o' = \frac{1}{2\pi\sqrt{L_e(C_e + C_l)}} \text{[Hz]} \qquad \text{[Math 10]}$$

In a case where the area of the ground plate 11 is increased so that the ground plate 11 faces the entire antenna element 12 and thereby another nonnegligible stray capacitance $C_s$ is generated between the ground plate 11 and the antenna element 12, the antenna 1 has a resonant frequency represented by the following equation. This is because the stray capacitance $C_s$ is in series with the effective capacitance $C_e$.

$$f_o'' = \frac{1}{2\pi\sqrt{L_e\left(\frac{C_e C_s}{C_e + C_s} + C_l'\right)}} \text{[Hz]} \qquad \text{[Math 11]}$$

It should be noted here that the capacitance $C'_1$ of the shortening capacitor 14 that is necessary for $f_0' = f_0''$ to be satisfied is given by the following equations:

$$\frac{C_e C_s}{C_e + C_s} + C_l'' = C_e + C_l \qquad \text{[Math 12]}$$

$$C_l' = C_l + C_e - \frac{C_e C_s}{C_e + C_s}$$

Accordingly, $C'_1 > C_1$. Therefore, in the case where the area of the ground plate 11 is increased so that the ground plate 11 faces the entire antenna element 12, it is necessary to add the shortening capacitor 14 having a larger capacitance than that found by Equation (5).

In a case where a configuration is employed in which the ground plate 11 covers the back surface of the substrate 3 as illustrated in FIG. 12, it is possible to reduce variations (e.g., reduction in radiant intensity and deformation of radiation distribution) in antenna characteristics that may occur when a conductor (e.g., human body or metal) approaches the back surface of the substrate 3.

(Effects of Ground Substrate and Antenna Element Provided on Front and Back Surfaces of Substrate)

Generally, the radiation efficiency η of an antenna is given by the following Equation (10). In Equation (10), Rrad is radiation resistance of the antenna, and Rloss is resistance loss of a conductor constituting the antenna.

[Math 13]

$$\eta = \frac{R_{rad}}{R_{rad} + R_{loss}} \quad (10)$$

As for the conductor constituting the antenna, the relationship between the resistance loss Rloss and electric conductivity a is generally given by the following Equation (11). In Equation (11), L is the length of the conductor constituting the antenna, and S is the cross-sectional area of the conductor constituting the antenna.

[Math 14]

$$R_{loss} = \frac{L}{\sigma \cdot S} \quad (11)$$

As is clear from Equation (10), in order to increase the radiation efficiency η of the antenna, it is only necessary to reduce the resistance loss Rloss of the conductor constituting the antenna. Furthermore, as is clear from Equation (11), in order to reduce the resistance loss Rloss of the conductor, it is only necessary to increase the electric conductivity a of the conductor. Accordingly, in order to increase the radiation efficiency η of the antenna, it is only necessary to increase the electric conductivity a of the conductor constituting the antenna.

However, a material having a higher electric conductivity tends to be more expensive. In particular, as for silver paste for the formation of printed circuits, its electric conductivity depends on the amount of silver particles contained and so the electric conductivity is directly linked to costs. Therefore, when the entire antenna is made from a material having a high conductivity for an increase in radiation efficiency, production cost increases. This is a problem.

Meanwhile, in the antenna 1 including the ground plate 11 and the antenna element 12, it is not the electric conductivity of the ground plate 11 but the electric conductivity of the antenna element 12 that mainly contributes to an improvement of radiation efficiency. Therefore, by making the ground plate 11 from a material that does not have a high electric conductivity but is reasonable (e.g., silver paste containing a small percentage of silver particles) and making the antenna element 12 from a material that is expensive but has a high electric conductivity (e.g., silver paste containing a large percentage of silver particles), it is possible to achieve high radiation efficiency and low production cost at the same time. Usually, the ground plate 11, which is a planar conductor, has a larger area than the antenna element 12, which is a linear or ribbon-shaped conductor. Therefore, cost reduction achieved by such an arrangement is not negligible.

As has been described, the antenna 1 in accordance with the present embodiment is configured such that the ground plate 11 is provided on the back surface of the substrate whereas the antenna element 12 is provided on the front surface of the substrate. Therefore, it is possible to employ a configuration in which the ground plate 11 is made (e.g., printed) from a material that does not have a high electric conductivity but is reasonable whereas the antenna element 12 is made (e.g., printed) from a material that is expensive but has a high electric conductivity. That is, it is possible to achieve high radiation efficiency and low production cost at the same time.

In particular, according to the configurations illustrated in FIGS. 10 to 12, since the ground plate 11 is provided on the back surface of the substrate 3, the front surface of the substrate 3 has an enough space for various circuits (such as an oscillation circuit and a detector circuit). Accordingly, when producing an antenna substrate including various circuits, it is possible to employ a single-sided mounting (in which the various circuits, together with the shortening capacitor 14, are provided on the front surface of the substrate 3). By employing such a single-sided mounting, it is possible to reduce the thickness and production cost of the antenna substrate as compared to the case where the antenna substrate is double-sided.

[Closing]

As has been described, an antenna in accordance with Embodiment 1 and an antenna in accordance with Embodiment 2 are each an antenna including: a ground plate and an antenna element provided on an identical plane; and a capacitor that bridges the ground plate and an end part of the antenna element which end part is opposite to a power feed-side end part. An antenna in accordance with Embodiment 3 is an antenna including: a ground plate provided on a first plane; an antenna element provided on a second plane that is parallel to the first plane; and a capacitor that bridges the ground plate and an end part of the antenna element which end part is opposite to a power feed-side end part.

According to the configuration, since the ground plate and the antenna element are provided on an identical plane or on respective planes parallel to each other, it is possible to realize a thin antenna that can be mounted in or on a wireless tag. In addition, the capacitor makes it possible to cause the operating frequency band of the antenna to be shift lower without increasing the total length of the antenna element. Accordingly, it is possible to realize an antenna configured to operate in a lower frequency band, without increasing its size. It should be noted that the antenna is a monopole antenna including a ground plate and an antenna element. Therefore, the antenna has a higher radiative power than a loop antenna that has an antenna element of the same length, and is also suitable for use in an active tag.

The antenna is preferably configured such that: the ground plate and the antenna element are provided within a rectangular region of 85.6 mm×54.0 mm; and an operating frequency of the antenna is equal to or lower than 322 MHz.

According to the configuration, it is possible to realize a wireless tag (e.g., a wireless tag having the size of an ID-1 card specified in ISO/IEC7810) which is easily portable and is easily compatible with other IC cards. Furthermore, since the antenna operates at a frequency equal to or lower than 322 MHz, it is possible to realize a wireless tag that achieves a strong-enough electric field strength and is easily accessible to everyone.

The antenna is preferably configured such that: the antenna element is a ribbon-shaped conductor; and the capacitance of the capacitor is set so as to be not less than 0.5×Co but not greater than 1.5×Co, where Co [F] is C obtained by substituting d=W into the following Equation (A):

[Math 15]

$$C = \frac{1}{120\pi f \left\{ \ln\left(\frac{4h}{d}\right) - 1 \right\}} \tan\left\{ \frac{2\pi}{\lambda} \left(\frac{\lambda}{4} - h\right) \right\} [F] \quad (A)$$

wherein f [Hz] is an/the operating frequency band of the antenna, λ [m] is an/the operating wavelength of the antenna found from λ=c/f where c is the speed of light, h [m] is a/the total length of the antenna element, and W [m] is a mean width of the antenna element.

According to the configuration, it is possible to reduce the total length of the antenna element, which should be λ/4 when no capacitor is provided, to h<λ/4 without changing the operating frequency band.

The antenna is preferably configured such that a capacitance of the capacitor is set so that a total length of the antenna element is equal to or less than λ/8, where λ is an operating wavelength of the antenna.

According to the configuration, it is possible to reduce the total length of the antenna element, which should be λ/4 when no capacitor is provided, to equal to or less than λ/8 without changing the operating frequency band.

The antenna is preferably configured such that: the ground plate has a recess at its edge; and the second end part of the antenna element is positioned in an area defined by the recess.

According to the configuration, it is possible to cause an IC chip, which is directly connected to the power feed-side end part of the antenna element in the wireless tag, to be positioned away from a main part of the antenna element. Accordingly, it is possible to suppress a distortion of an electromagnetic field around the main part of the antenna element by the IC chip and thus possible to suppress a deterioration of antenna characteristics.

It is preferable that the antenna further includes a short-circuit section that short-circuits an intermediate part of the antenna element and an/the edge of the ground plate, and that a power feed line part of the antenna element, the power feed line part extending from the second end part to the intermediate part, is positioned within a region defined by the ground plate, the short-circuit section, and a main part of the antenna element which main part extends from the intermediate part to the first end part.

According to the configuration, even in a case where an external conductor makes contact with the edges of the wireless tag (e.g., even in a case where the wireless tag is held in a user's hand), effects of the external conductor on the power feed line part of the antenna element are suppressed. This makes it possible to reduce a deterioration of antenna characteristics caused by the effects of the external conductor.

It should be noted that the short-circuit section serves to control the input impedance of the antenna, and that the intermediate part does not necessarily mean that it is in the midpoint between the opposite ends of the antenna element. That is, the intermediate part need only be in such a position that the input impedance of the antenna becomes a desired level, and may be any position between the opposite ends of the antenna element.

The antenna is preferably configured such that at least one of (i) an end part, which is opposite to an intermediate part-side end part, of the short-circuit section and (ii) the first end part of the antenna element is connected to a side constituting the edge of the ground plate in a position between an end and middle of the side.

According to the configuration, even in a case where an external conductor makes contact with the edges of the wireless tag (e.g., even in a case where the wireless tag is held in a user's hand), effects of the external conductor on the antenna element are suppressed. This makes it possible to reduce a deterioration of antenna characteristics caused by the effects of the external conductor.

It is preferable that the antenna further includes a short-circuit section that short-circuits the second end part of the antenna element and an edge of the ground plate, and that a region defined by the edge of the ground plate, the antenna element and the short-circuit section is divided into two regions by a line connecting power feed points.

According to the configuration, it is possible to allow the antenna to have not only a resonant frequency that depends on the total length of the antenna element and the capacitance of the capacitor but also two resonant frequencies that depend on the shapes of the two regions.

It should be noted that a wireless tag containing the antenna is also encompassed in the present invention.

[Additional Remark]

The present invention is not limited to the descriptions of the respective embodiments, but may be altered within the scope of the claims. An embodiment derived from a proper combination of technical means altered as appropriate within the scope of the claims is also encompassed in the technical scope of the invention.

INDUSTRIAL APPLICABILITY

An antenna in accordance with the present invention is suitably usable as an antenna to be mounted in or on a wireless tag. The antenna is also suitably usable as an antenna to be mounted in or on a Zigbee (registered trademark) module which is compliant with IEEE802.15.4.

REFERENCE SIGNS LIST 1 antenna
11 ground plate
11A short side (side that constitutes an edge of a ground plate)
11B long side
11a recess
11b protrusion
12 antenna element
12A power feed-side end part
12B end part opposite to power feed-side end part
12C intermediate portion (intermediate part)
12a first linear part (power feed line part)
12b second linear part (power feed line part)
12c third linear part (main part)
12d fourth linear part (main part)
12e fifth linear part (main part)
13 short-circuit section
14 shortening capacitor (capacitor)
2 wireless tag
2A short side
2B long side

The invention claimed is:

1. An antenna comprising:
a ground plate provided on a first plane;
an antenna element at least part of which is provided on a second plane, the second plane being identical to the first plane or being a plane parallel to the first plane; and
a capacitor that bridges the ground plate and a first end part of the antenna element, the first end part being opposite to a second end part that is a power feed-side end part,
wherein:
the antenna element is a ribbon-shaped conductor; and
the capacitance of the capacitor is set so as to be not less than $0.5 \times C_o$ but not greater than $1.5 \times C_o$, where $C_o$ [F] is C obtained by substituting d=W into the following Equation (A):

$$C = \frac{1}{120\pi f\left\{\ln\left(\frac{4h}{d}\right) - 1\right\}} \tan\left\{\frac{2\pi}{\lambda}\left(\frac{\lambda}{4} - h\right)\right\} [F] \quad (A)$$

wherein f [Hz] is a resonant frequency of the antenna, λ [m] is a resonant wavelength of the antenna found from λ=c/f where c is the speed of light, h [m] is a total length of the antenna element, and W [m] is a mean width of the antenna element.

2. The antenna according to claim 1, wherein a capacitance of the capacitor is set so that the total length of the antenna element is equal to or less than λ/8, where λ is the resonant wavelength of the antenna.

3. The antenna according to claim 1, wherein the ground plate and the antenna element are provided on a single planar substrate.

4. The antenna according to claim 3, wherein one of the first and second planes is a back surface of the planar substrate and the other is a front surface of the planar substrate.

5. The antenna according to claim 4, wherein:
the planar substrate has a size of equal to or smaller than 85.6 mm×54.0 mm; and
the resonant frequency of the antenna is equal to or lower than 322 MHz.

6. The antenna according to claim 3, wherein:
the planar substrate is a multilayer substrate;
the first plane is a plane included in a first layer that is an inner layer or an outer layer of the planar substrate; and
the second plane is a plane included in a second layer that is an inner layer or an outer layer of the planar substrate, the second layer being other than the first layer.

7. The antenna according to claim 1, wherein the second plane is identical to the first plane.

8. The antenna according to claim 7, wherein:
the ground plate and the antenna element are provided within a rectangular region of equal to or smaller than 85.6 mm×54.0 mm; and
the resonant frequency of the antenna is equal to or lower than 322 MHz.

9. The antenna according to claim 7, wherein:
the ground plate has a recess at its edge; and
the second end part of the antenna element is positioned in an area defined by the recess.

10. An antenna according to claim 7, further comprising a short-circuit section that short-circuits an intermediate part of the antenna element and an edge of the ground plate,
wherein a power feed line part of the antenna element, the power feed line part extending from the second end part to the intermediate part, is positioned within a region defined by the ground plate, the short-circuit section, and a main part of the antenna element which main part extends from the intermediate part to the first end part.

11. The antenna according to claim 10, wherein at least one of (i) an end part, which is opposite to an intermediate part-side end part, of the short-circuit section and (ii) the first end part of the antenna element is connected to a side constituting the edge of the ground plate in a position between an end and middle of the side.

12. An antenna according to claim 7, further comprising a short-circuit section that short-circuits the second end part of the antenna element and an edge of the ground plate,
wherein a region defined by the edge of the ground plate, the antenna element and the short-circuit section is divided into two regions by a line connecting power feed points.

13. A wireless tag comprising an antenna recited in claim 1.

14. A wireless tag according to claim 13, further comprising a battery, wherein the ground plate and the battery are provided within a rectangular region of equal to or smaller than 85.6 mm×54.0 mm such that they do not overlap each other.

15. The wireless tag according to claim 13, which has a shape of a card.

* * * * *